June 1, 1965

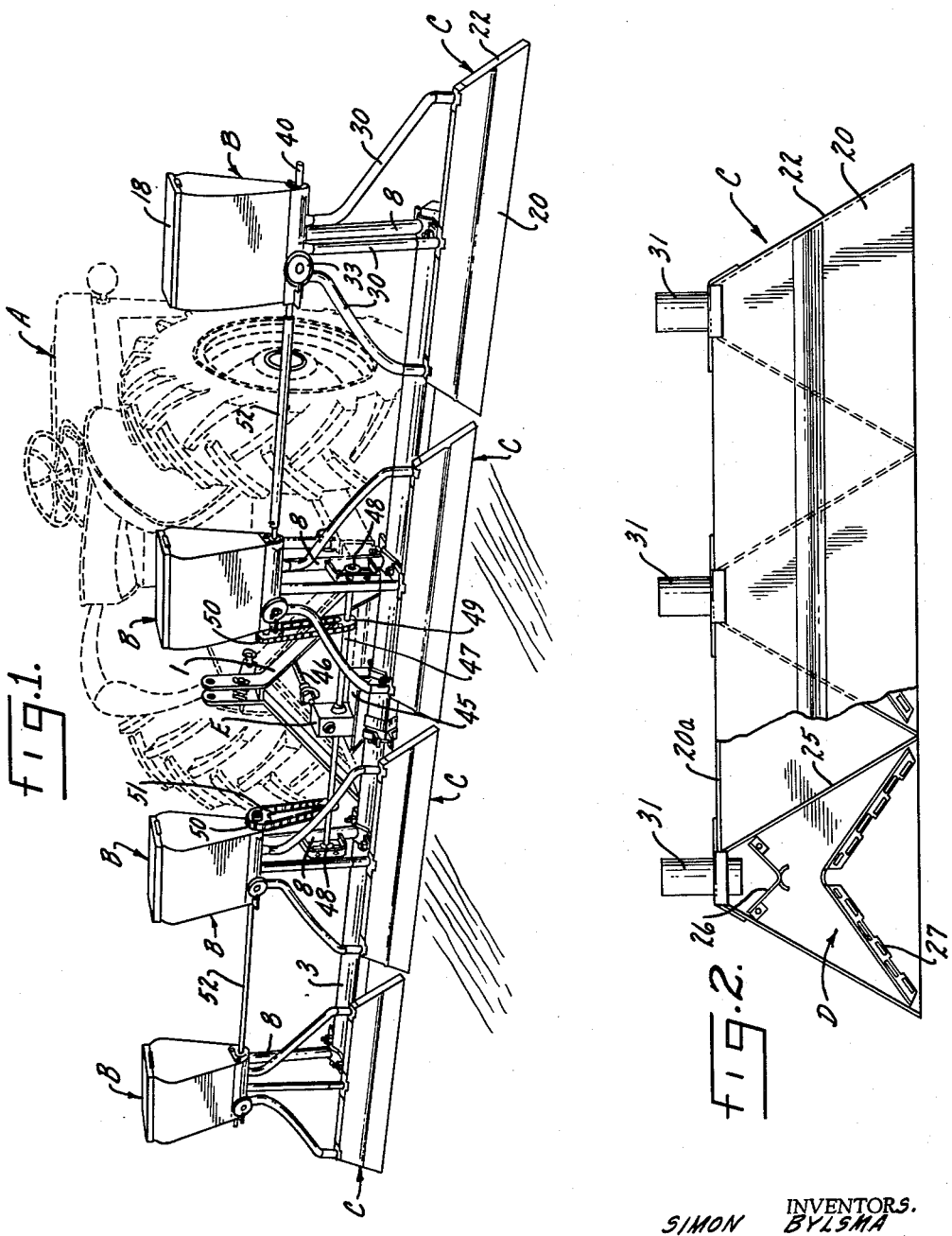

H. L. SOSALLA ETAL 3,186,719

MULTIPLE APPLICATORS

Filed Jan. 23, 1962

INVENTORS.
SIMON BYLSMA
HARRY L. SOSALLA
BY Parker & Carter
Attorneys.

United States Patent Office 3,186,719
Patented June 1, 1965

3,186,719
MULTIPLE APPLICATORS
Harry L. Sosalla and Simon Bylsma, Sac City, Iowa, assignors to Noble Manufacturing Company, Sac City, Iowa, a corporation of Iowa
Filed Jan. 23, 1962, Ser. No. 168,133
4 Claims. (Cl. 275—14)

The invention relates to an improvement in applicators, for example, for agricultural use. One purpose is to provide an improved applicator or assembly which shall be of maximum flexibility and which includes a plurality of individually and removably mounted units.

Another purpose is to provide such an assembly in which a varying number of units may be employed.

Another purpose is to provide such an assembly in which the material to be applied is delivered to the surface treated in a substantially continuous zone of treatment extending transversely of the path of movement of a conveying or actuating vehicle, throughout a desired transverse extension.

Another purpose is to provide a flexible actuating assembly for a plurality of applicator units which may, for example, be applicable to a variable number of units.

Another purpose is to provide an improved applicator unit or group of units arranged to define a linear zone of treatment of substantial transverse extension.

Other purposes will appear from time to time in the course of the specification and claims.

The invention is illustrated more or less diagrammatically in the accompanying drawings wherein:

FIGURE 1 is a rear view, in perspective, of a gang of units mounted upon and actuated by a piece of equipment, such as a tractor;

FIGURE 2 is an elevation, with parts broken away, and parts in section, of an individual unit;

Like parts are indicated by like symbols throughout the specification and drawings.

Figure 3:
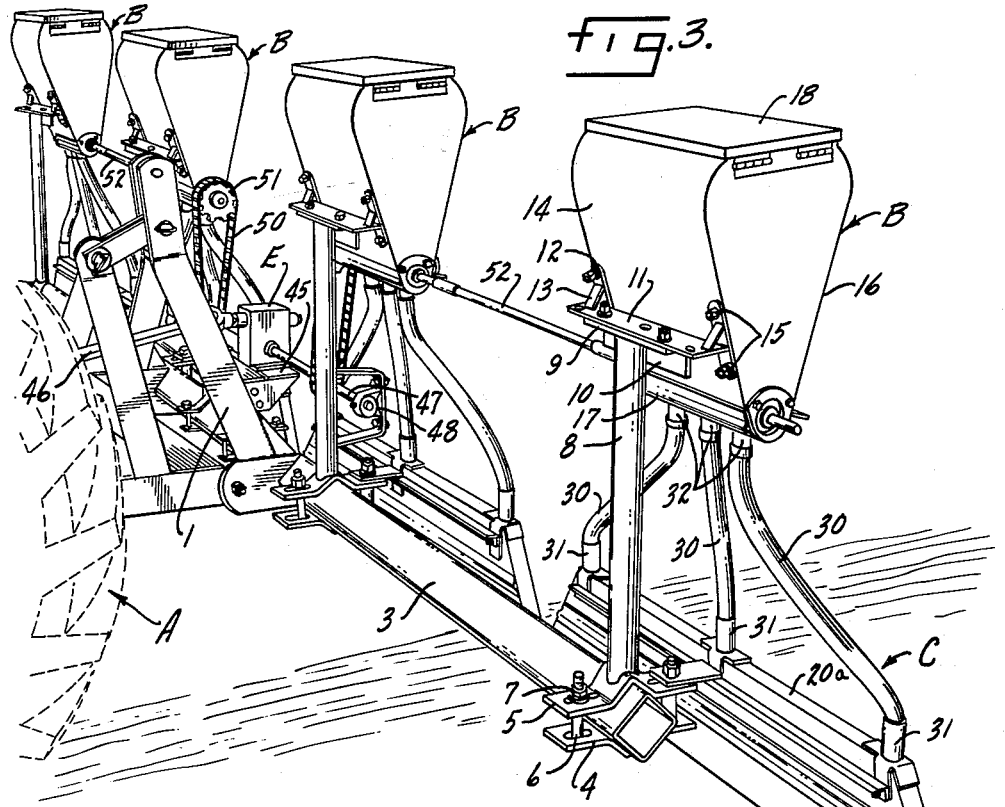
FIGURE 3 is a perspective view showing from in front a gang of applicator units.
Figure 4:
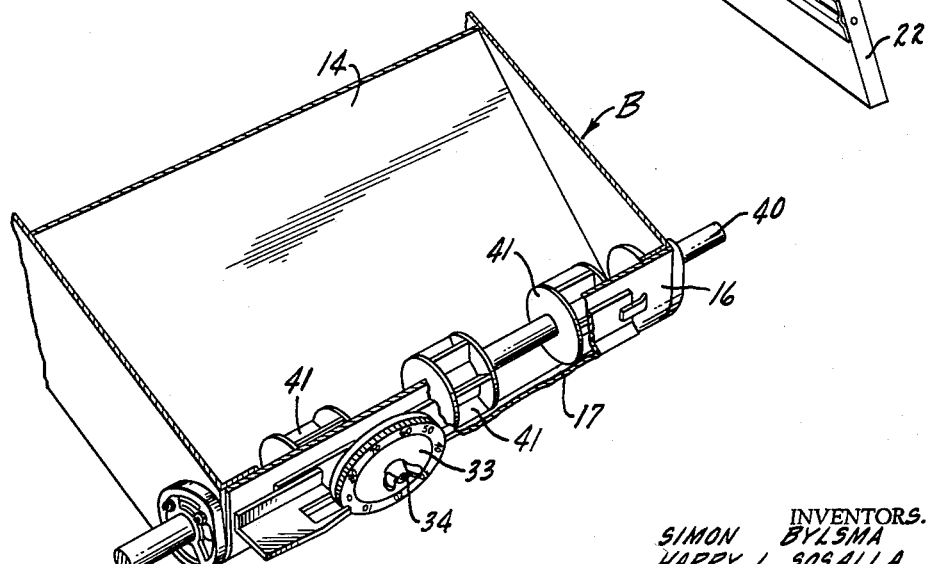
FIGURE 4 is a detail of the supply and feed mechanism for one of the units.

Referring to the drawings, and, for example, to FIGURES 1 and 3, A generally indicates a piece of equipment, such as a farm tractor, upon which the applicator assembly may be mounted and by which it may be actuated. The details of the tractor are not of themselves part of the present invention, and it will be understood that a wide variety of such actuating and supporting fingers may be employed. However, supporting parts of the tractor are illustrated in the form of an A-frame generally indicated at 1 in FIGURES 1 and 3, which may include whatever parts are necessary for the support of the below described equipment. Suitably secured to or supported by the A-frame is a transversely extending bar or support 3, herein shown as a hollow bar or pipe, generally rectangular in cross-section. It will be understood that such a pipe or bar may be secured to or supported on a suitable conveying vehicle A by any suitable means, the the details of which do not form part of the present invention. It will also be understood that the bar or support 3 may be removably mountable upon the tractor and may be of any desired length, it being understood that bars of different length may, at different times, if desired, be secured to the same tractor. What is essential is that a transverse support is provided, of sufficient length to carry a desired number of the below described applicator units. Considering, for example, the structure of FIGURES 1 and 3, the support for one such applicator unit is indicated at each end of the bar or support 3. A clamping mechanism is shown including a lower plate 4 and an upper plate 5, the two plates being offset to provide clamping parts intermediate their ends, which conform to or engage, respectively, opposite parts or corners of the bar or support 3, they being held in clamping relationship, for example, by bolts, with nuts 7. It will be understood, of course, that if the cross-section of the bar or support 3 is other than as shown in FIGURES 1 and 3 then a suitable change may be made in the shaping and details of the clamping means.

Upwardly extending from the upper plate 5 is a generally vertical support 8 which may carry at its upper end a transverse plate 9 and a generally vertical plate 10. If desired, the two plates may be constituted by a length of angle iron of sheet metal or the like. Suitably secured to the plate or horizontal member 9 is a supporting plate 11 having angular supports 12 secured to it, and connected, for example, by braces 13. The angle of the members 12 is set to conform to a side wall 14 of a feed hopper generally indicated as B. Thus the feed hopper, preferably of light, strong material, such as a suitable reinforced plastic, may be bolted to the members 12 by bolts 15, and when so secured is in generally upright position.

Considering the details of the hoppers B, it will be understood that any suitable number of them may be employed, supported by supporting assemblies, which may be identical with the one shown at the right-hand end of FIGURE 3. In FIGURES 1 and 3, four such hoppers B are indicated. Each such hopper is formed with downwardly converging side walls 14 and 16, which may be connected at the bottom by a generally arcuate connecting wall 17. The top is closed by a suitable hinged lid 18. Each hopper B is shown as delivering the material to be applied to an applicator assembly, generally indicated as C. This assembly includes outer side walls, of which the front wall 20 is illustrated, for example, in FIGURES 1 and 2. A similar rear wall is generally parallel with it, the front and rear walls being bounded by downwardly and outwardly extending end walls 22. It will be understood that the side walls and the end walls define a downwardly open space. Within the side and end walls I illustrate a plurality of applicator units which may be generally like those shown in FIGURE 2 of the copending application Serial No. 58,924, filed on September 28, 1960, now Patent No. 3,074,727. For convenience, it will be noted that each such unit is formed with generally parallel side walls and downwardly and outwardly diverging end walls 25, the side and end walls defining an open bottom space. The units may be arranged, as shown in FIGURE 2, to abut, whereby all or substantially all of the length of the bottom opening of each of the applicators C is substantially equal to the sum of the individual bottom openings of the individual units D. In the structure herein shown, as in FIGURE 2, three of the sub-units D are employed with each applicator unit C. Similarly, by abutting or substantially abutting a plurality of the units C there is maintained a zone of delivery or application of the substance handled which extends transversely for the sum of the lengths of the individual applicator units C. Each sub-unit D may have any suitable means for maintaining a generally uniform delivery of material throughout the length of its discharge opening. Shown, for example, is an upper, apertured dispersing V 26 and a lower, apertured V-shaped distribution member 27, with its upwardly faced apex generally aligned with the downwardly faced apex of the member 26. However, any suitable means may be employed for maintaining a uniform transverse distribution of the material to be applied.

Since each unit C is associated with one of the hoppers B, and since each unit C has, in the present instance, three sub-units D, it is practical to provide individual discharge passages from each hopper to the three sub-units D with which it is associated. Such discharge means are shown, for example, as a plurality of tubes 30 extending to fittings 31 located at various points along the top wall 20a of each unit C. The tubes 30 extend to similar discharge units 32, suitably arranged on the bottom wall 17 of each hopper B. It will be understood, of course, that the wall 17 is provided with discharge apertures aligned with each of the fittings 32. These discharge apertures are suitably shuttered for adjustment by a moving shutter structure which may be controlled, for example, by rotation of the metering disk 33. This disk may be calibrated and may be set at any desired calibration, and may then be locked in position, for example, by the wing nut 34. It will be understood that, since a single shutter is moved by the metering disk 33, the rotation of the disk simultaneously sets each of three discharge openings, one for each of the fittings 32, to insure a uniform rate of delivery from each hopper B to its associated applicator sub-units D. In order to assist in the uniform feed of material, and to prevent choking, a rotor bar 40 is shown for each of the units B. It carries rotors or feed assemblies 41, each one of which is aligned with one of the apertures in the bottom wall 17 of its associated hopper.

It is important that these rotor bars or feeding units be operated at a uniform controlled speed. For example, where four of the hoppers B are employed it is advantageous to employ a single power means which may include, for example, the gear box E, which may also be mounted upon the transverse bar or support 3 and may, for example, be upon any suitable platform 45 removably secured upon the bar. The gear box E may be actuated by any suitable drive means, such as the shaft 46, which may extend from the power take-off of the tractor. It, in turn, drives a drive shaft 47, the ends of which are shown as mounted in bearing supports 48 on the two adjacent upright supporting elements 8. At each side extension of the shaft 47 is illustrated a sprocket 49 which, through a chain 50, drives a similar sprocket 51 located at the inner end of the shaft 40 of the adjacent hopper unit B. Thus, with reference to the position of the parts as shown in FIGURE 1, the right-hand sprocket 49 drives the sprocket 51 on the rotor 40 of the hopper B next to the right of the take-off E. Similarly, the left-hand sprocket 49 drives the rotor of the hopper B next to the left. These two hoppers, in turn, through connecting or actuating rods 52, drive the rotors for the end units or hoppers B. Thus, through the power take-off E, all four of the hoppers B are caused to feed material through three outlets or tubes 30 to the sub-units D. The operator, of course, must properly set the metering disks 33 to obtain the desired rate of feed throughout the width of the applicator assembly. Presumably, in most situations, what is desired is a uniform rate throughout the width of the transverse delivery zone. However, if, for any reason, the user wishes to vary the rate from unit to unit he can do so.

It will be realized that, whereas, there is described and illustrated a practical and operative device, nevertheless many changes may be made in the size, shape, number and disposition of parts without departing from the spirit of the invention. It is therefore desired that the description and drawings be taken as in a broad sense illustrative or diagrammatic, rather than as limited to the precise showing.

The use and operation of the invention are as follows:

It is desired to obtain a zone of application of a maximum width or extension transversely of the path of movement of the actuating means. A typical application is the employment of a plurality of applicator units mounted on or drawn by a single tractor, these units being arranged end to end to provide, as shown herein, a maximum length of extension. It will be understood, of course, that by changing the length of the transverse support or bar 3 it may, within reasonable limits, be adapted to support any desired number of applicator units. It will also be understood that if a smaller number is desired one or more of the end units may be removed. It will be understood that any suitable means may be employed for connecting the intermediate driving sleeves 52 in such fashion that the units may be added or subtracted. For example, the hollow shaft 52 may surround the stub end of each rotor 40 and may be secured to it by a cotter pin, or otherwise, for efficient driving, while permitting easy disassembly.

We claim:

1. In an applicator system for agricultural machinery and the like, said applicator system being connectable and dis-connectable as a unit from a carrying structure such as a tractor or the like, said applicator system including, in combination, an elongated bodily rigid applicator support extending generally transversely with respect to the direction of travel of the applicator system, a plurality of applicator subassemblies mounted on and disposed in generally aligned relationship one to the other substantially parallel to the transversely extending support, each such subassembly including an individual hopper, a metering and feed assembly for each such hopper, and a plurality of discharge tubes extending from each such hopper, a casing beneath the hopper of each sub-assembly, each such casing being substantially wider transversely than along the longitudinal axis of the tractor, and a plurality of individual applicator sub-units arranged end to end within and along the transverse extension of the casing, whereby to provide a generally continuous zone of application from end to end of each such casing, the casings being mounted in transverse alignment along the support, whereby to provide a generally continuous zone of application extending transversely across the path of movement of the tractor, the discharge tubes from each hopper extending to the individual applicator sub-units within the casing with which such hopper is associated, generally vertically extending structure for rigidly mounting each hopper and its associated applicator sub-assembly to the applicator support, and for fixedly positioning each hopper with respect to its associated applicator sub-assembly, and connecting means for fixedly mounting the applicator support to the carrying structure whereby the relative positions of the applicator sub-assemblies to the ground are fixed upon connection of the applicator support to the carrying structure.

2. The structure of claim 1 further characterized by and including means for driving in unison the feed assemblies of the hoppers.

3. The structure of claim 1 characterized by and including generally aligned feed rotors for each hopper, means for rotating the rotor of one such hopper at a predetermined rate, and direct connecting means for driving the rotor of an adjacent hopper in response to the rotation of the rotor of the first mentioned hopper.

4. The structure of claim 1 further characterized in that each of the forward and rearward walls of the sub-units comprising each casing are formed from an integral piece of material to thereby form, in conjunction with the transverse walls forming each sub-unit, a unitary applicator sub-assembly in which the material discharge area configuration of each sub-unit is fixed with respect to all other sub-units within a common casing.

References Cited by the Examiner
UNITED STATES PATENTS

| | | | |
|---|---|---|---|
| 21,034 | 7/58 | Thomas et al. | 222—139 |
| 681,571 | 8/01 | McVea. | |
| 958,772 | 5/10 | Rogers et al. | 275—14 X |
| 2,990,186 | 6/61 | Gandrud | 275—14 |

ABRAHAM G. STONE, *Primary Examiner.*

LOUIS J. DEMBO, WILLIAM A. SMITH III, *Examiners.*